UNITED STATES PATENT OFFICE.

ANDRÉ HELBRONNER, OF PARIS, FRANCE.

MANUFACTURE OF CEMENT.

1,239,912.     Specification of Letters Patent.     Patented Sept. 11, 1917.

No Drawing.     Application filed December 29, 1913. Serial No. 809,224.

*To all whom it may concern:*

Be it known that I, ANDRÉ HELBRONNER, a citizen of the French Republic, residing at Paris, France, have invented a new and useful Improvement in the Manufacture of Cement, of which the following is a specification.

This invention relates to the manufacture of a white or nearly white cement. The cement is made from raw materials which contain substances which in the usual manufacture of cement would discolor the product and greatly reduce its salable value.

Generallly in white cement manufacture it has been found necessary to use kaolins and other clays which are free of oxid of iron. If oxid of iron is present, the resulting cement is gray in color and is of much less value than if white. In white cement manufacture, mixtures of kaolin, calcareous material are mixed with suitable fluxes such as feldspar or boracic acid and submitted to the influence of heat. Generally the fuel for producing the heat must be kept from contact with the materials since the fuel itself contains considerable quantities of iron oxid.

In this improved process the fuel can be mixed directly with the mixture since it is possible to use common clays containing iron oxids in considerable quantities. The iron oxid in the fuel merely adds to the iron oxid in the clay and is converted into other substances which do not discolor the resulting product.

In my improved process I add to the raw materials employed (bricks, calcareous clay, slag, etc.) a certain amount of calcium chlorid. The exact amount of calcium chlorid added depends upon the weight of iron oxid present in the raw material and the fuel but it is preferable that the weight of calcium chlorid used, be slightly in excess of the weight of iron oxid present in the mixture. The mixture is then submitted at high temperatures to the action of steam. When this is done it will be found that the reversionary reaction of nascent hydrochloric acid formed by combination of the calcium chlorid and steam takes place in such direction that the iron oxid is acted upon and converted into iron chlorids which under the influence of high temperatures are volatilized and driven from the mixture. The resulting product is a white cement free from the deleterious colored iron oxids.

As an illustration of this process I have utilized a mixture of 4 parts of clay,
    15 parts of calcium carbonate,
    1 part of calcium chlorid.

This mixture is then submitted at high temperature to the action of superheated steam. If so desired coal may be added directly to the mixture. This renders the material more porous as the coal is consumed and any oxid of iron in the ashes of the coal is converted into the volatile chlorids and driven from the mixture. The coal in the mixture also supplies a certain amount of heat which aids the reaction.

As calcium chlorid is a comparatively valueless industrial residue its utilization in the manufacture of the much sought white cement provides an additional use for this comparatively worthless substance. It will be understood, however, that other earth chlorids may be utilized as well, for example, barium or magnesium chlorid.

Another of the well known kilns may be utilized in the carrying out of this process. If desired, the well known vertical kilns may be used. In usual cement manufacture clay and calcareous material are first dried, then mixed and finally kneaded with about 25–35% of water. With the present process the water may be replaced with a solution of calcium chlorid. After mixing, the paste and the fuel is arranged in successive layers in the kiln and fired or if desired the clay, calcareous material, calcium chlorid solution and fuel are all mixed into an agglomerate mass and placed in the kiln. This method is advantageous in that it permits a closer intermixture of the nascent hydrochloric acid and the mixture and a resulting better conversion of the iron oxid into iron chlorid.

In practice the steam is admitted into the lower part of the kiln through one or more blast pipes which also supply air and gaseous fuel as is well known in cement manufacture. Or if desired the steam may be admitted through a central pipe. It is desirable that the steam in passing through the mixture be in a superheated condition. The superheated steam will readily penetrate the material and carry out the reaction described even if the material is in the form of bricks.

Another way of carrying out the process consists in blowing into the kiln by means of an injector a mixture of clay, lime, coal, calcium chlorid, steam and air.

It is important in carrying out this process that the steam and air be carefully proportioned so that the hydrochloric acid evolved will be sufficiently concentrated to effect the decolorization. It is also desirable that the air and steam be controlled so that an oxidizing atmosphere be present in the kiln. With such an atmosphere the conversion changes the iron into ferric chlorid which is more volatile than the ferrous chlorid which otherwise would be formed.

If desired other compounds may be used than calcium chlorid. It is only necessary that calcium chlorid be produced at some stage in the manufacture of cement. For example I may use chlorid of lime.

The temperature required for the decomposition of calcium chlorid is from 900° to 1200° C.; but as cement manufacture requires higher temperatures it is necessary that the substances at the end of the reaction be submitted to a temperature of from 1400° to 1500° C.

If desired I may replace coal and steam with water gas and air.

The use of steam is necessary when it is desired to employ the ordinary raw material for the production of the cement and when white cement is required, but in the cases where it is desired to obtain a slightly colored cement, it is possible to employ the known reaction of chlorid of lime upon potassic feldspar, but this reaction will be effected according to the present invention with new conditions and in an original manner.

It has been found that the action of the mixture of lime and calcium chlorid upon orthoclase at the very high temperature of 1400°–1500° not only allows the complete extraction of the potash from a feldspar (orthoclase) in the form of volatile potassium chlorid but also allows the simultaneous production of a Portland cement of a highly satisfactory composition and quality.

The reaction is effected by means of a progressive heating up to 1400°–1500° of an intimate mixture, of a natural silicate of alumina and potash (and particularly of the feldspar orthoclase) with a suitable proportion of lime, and calcium chlorid in quantity sufficient or somewhat in excess of that necessary to transform the potash of the silicate into chlorid according to the reaction:

$$K_2O + 2HCl = 2KCl + H_2O$$

which at the temperature of 1400° is effected in a complete manner.

If the proportions of orthoclase, carbonate of lime, calcium chlorid are properly determined the potash is entirely volatilized in the form of chlorid which is recovered by the usual methods employed in such cases (condensing chambers sprays, etc.) and the residue gives a Portland cement, all of whose elements are found to be completely combined and in the same proportions as in the best qualities of cement, as it is easy to see from the composition of orthoclase.

For example, the following materials will be progressively heated to 1400°–1500° C. in a blast of air:

Orthoclase _____ 36 parts,
Carbonate of lime_____ 100 parts,
Calcium chlorid _____ 10 parts, together with a sufficient quantity of coal in a rotary furnace.

In previous processes attempts have not been made to obtain a complete abstraction of all the potash from the feldspar, and such previous processes did not produce a product which could be utilized in the manufacture of cement. On the contrary by means of the present process the whole of the potash contained in the feldspar is liberated in the form of KCl; the cement thus produced is practically free of combined alkali and it is known that a quantity of 1% of alkali renders the cement useless.

The orthoclase, carbonate of lime, and coal, will be chosen as pure as possible in order to obtain a cement of a minimum coloration.

It will be understood that the term "ferrugineous raw materials" as used in the claims refers to raw materials such as used in cement manufacture which contain iron, for example common clay containing considerable quantities of oxid of iron.

What I claim is:

1. A process for manufacturing white Portland cement by mixing the ordinary ferrugineous raw materials of cement and calcium chlorid, heating the mixture progressively up to 1400°–1500° C. and submitting the mixture during the heating to the action of superheated steam, thereby volatilizing the metallic chlorids and collecting the white cement produced.

2. A process for manufacturing white Portland cement by mixing the ordinary ferrugineous raw materials of cement and calcium chlorid, heating the mixture progressively in an oxidizing atmosphere up to 1400°–1500° C. and submitting the mixture during the heating to the action of superheated steam, thereby volatilizing the metallic chlorids and collecting the white cement produced.

3. A process for manufacturing white Portland cement by mixing the ordinary ferrugineous raw materials of cement and calcium chlorid by mixing ferrugineous clay, lime and calcium chlorid, heating the mixture progressively up to 1400°–1500° C. and submitting the mixture during the heating to the action of superheated steam, thereby volatilizing the metallic chlorids and collecting the white cement produced.

4. A process for manufacturing white Portland cement by mixing the ordinary ferrugineous raw materials of cement, calcium chlorid and fuel, heating the mixture progressively up to 1400°–1500° C. and submitting the mixture during the heating to the action of superheated steam, thereby volatilizing the metallic chlorids and collecting the white cement produced.

5. A process for manufacturing white Portland cement by mixing ferrugineous clay, lime, calcium chlorid and coal, heating the mixture progressively up to 1400°–1500° C. and submitting the mixture during the heating to the action of superheated steam, thereby volatilizing the metallic chlorids and collecting the white cement produced.

6. A process for manufacturing white Portland cement by mixing ferrugineous clay, lime, calcium chlorid and coal, agglomerating the mixture into bricks, heating it progressively up to 1400°–1500° C. and submitting the mixture during the heating to the action of superheated steam, thereby volatilizing the metallic chlorids and collecting the white cement produced.

7. A process for manufacturing white Portland cement by mixing ferrugineous clay and calcium chlorid, then heating the mixture progressively in a blast of air up to 1400°–1500° C. and submitting the mixture during the heating to the action of superheated steam, thereby volatilizing the metallic chlorids and collecting the white cement produced.

In testimony whereof I affix my signature in presence of two witnesses.

ANDRÉ HELBRONNER.

Witnesses:
 HANSON C. COXE,
 JOHN BAKER.

It is hereby certified that in Letters Patent No. 1,239,912, granted September 11, 1917, upon the application of André Helbronner, of Paris, France, for an improvement in "The Manufacture of Cement," an error appears in the printed specification requiring correction as follows: Page 1, line 81, for the word "Another" read *Any;* and that the said Letters Patent should be read with this correction therein that the same may conform to the record of the case in the Patent Office.

Signed and sealed this 20th day of November, A. D., 1917.

[SEAL.]

R. F. WHITEHEAD,

*Acting Commissioner of Patents.*

Cl. 106—25